United States Patent

[11] 3,608,957

| [72] | Inventor | Ernst Maneck |
| | | Wolfsburg, Germany |
| [21] | Appl. No. | 836,232 |
| [22] | Filed | June 25, 1969 |
| [45] | Patented | Sept. 28, 1971 |
| [73] | Assignee | Volkswagenwerk AKG |
| | | Wolfsburg, Germany |
| [32] | Priority | July 2, 1968 |
| [33] | | Germany |
| [31] | | P 17 55 862.2 |

[54] RUNNING BOARD FOR VEHICLES
6 Claims, 5 Drawing Figs.

[52] U.S. Cl. ........................................ 296/146, 280/166
[51] Int. Cl. ........................................ B60r 3/00
[50] Field of Search .......................................... 296/146, 151; 280/166

[56]      References Cited
UNITED STATES PATENTS

| 1,621,479 | 3/1927 | Cleveland | 280/166 |
| 2,018,064 | 10/1935 | Hofacker | 280/166 |
| 3,095,216 | 6/1963 | Browne | 280/166 |

*Primary Examiner*—Philip Goodman
*Attorney*—Watson, Cole, Grindle & Watson

ABSTRACT: An automatically retractable running board for vehicles with sliding doors having at least two guide levers mounted in parallel to one another under a bottom plate and a lever movable horizontally under spring load together with a driver engaging the end of the lever and at the stop side of the sliding door.

INVENTOR.
Ernst Maneck
BY
Watson Cole Grindle & Watson
Attys.

RUNNING BOARD FOR VEHICLES

This invention relates to an automatically retractible running board for vehicles with sliding doors, especially for motor vehicles.

For the commercial transportation of passengers but also as an ambulance, and the like the so-called minibuses gain increasingly more use. With such vehicles which are frequently equipped with a sliding door, the floor for reasons of construction, is located relatively high above the road surface; therefore, there is a need to make entering of the vehicle more easy. Running boards which are capable of being folded down are known as being used for trucks. Such running boards are sometimes coupled with movement of the door but they possess certain disadvantages since they would occupy usable inside space in minibus, or they would affect the outside appearance of the vehicle or the harmony of the inside furnishings.

Therefore an object of this invention is to provide a running board of the type mentioned to facilitate entering; the arrangement of which need not necessarily be considered as a priority when designing the vehicle so that the designer can freely shape that section of the vehicle within the area of the running board according to the requirements of technical practicability and good design. At the same time a simple but sturdy mechanism is provided which converts the longitudinal movement of the sliding door into a transverse movement for the running board, so that the latter can come from its retracted position perpendicularly to the direction of travel, automatically into its readiness position.

A further object of the invention is to provide such a running board which is held by two guides, disposed parallel to one other below the bottom plate and mounted so it can be moved out horizontally with its outside longitudinal edge by means of a spring approximately in the plane of the door, and in that it has a horizontally swingable lever under spring load at the rear end perpendicular to the sliding door, in the end of which lever is provided a hook, which has been arranged on the top side of the sliding door, which a driver can engage. In accordance with this arrangement and development, the running board, when the sliding door is closed lies practically invisible below the bottom plate so that as a result thereof, the outside appearance of the vehicle is not influenced nor is the inside space impaired. Since the running board during its operation maintains its natural horizontal position, it requires only a slight constructional height with there always being space available in depth, and it requires a minimum of movable parts, such as joints or similar elements. Therefore, the entire mechanism can be constructed sturdily as a result of which a high degree of insensitiveness against functional disturbances will be achieved, especially if in further development of the invention, each guide is mounted approximately in the middle and in the moved-out state of the running board it abuts, with its free end against parts of the frame of the vehicle or of the body. For the purpose of complete utilization of a predetermined extension of the running board by means of the guides, the effective length of the levers and the distance passed by the running board perpendicular in relation to the sliding door, are equal.

Mounting of the lever on a peg with an oblong hole pointing in the direction of the hook between a flange of the running board and a rotationally fixed arm placed transversely in relation to the lever which serves for the suspension of a draw spring, which together with the oblong hole permits the resilient skipping of a cam connected with the lever by means of the slanted sides of a stop arranged at the edge of the flange, has proven itself particularly advantageous. As a result thereof, one will be able to achieve an opening in the event the driver, during the opening of the door has not seized the lever for some reason or other or that the driver upon starting of the lever from the backside, will not bend said lever, but press it by means of the stop and beyond it resiliently into a position which has no function.

Further objects of the invention will be apparent from the following description when considered in connection with the accompanying drawings in which.

Figure 1:
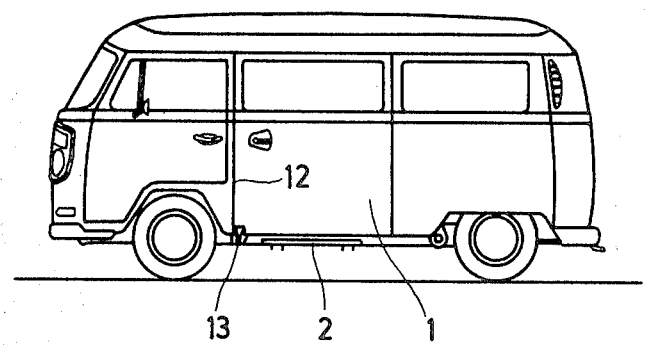
FIG. 1 is a side view showing a motor vehicle with a sliding door.
Figure 2:
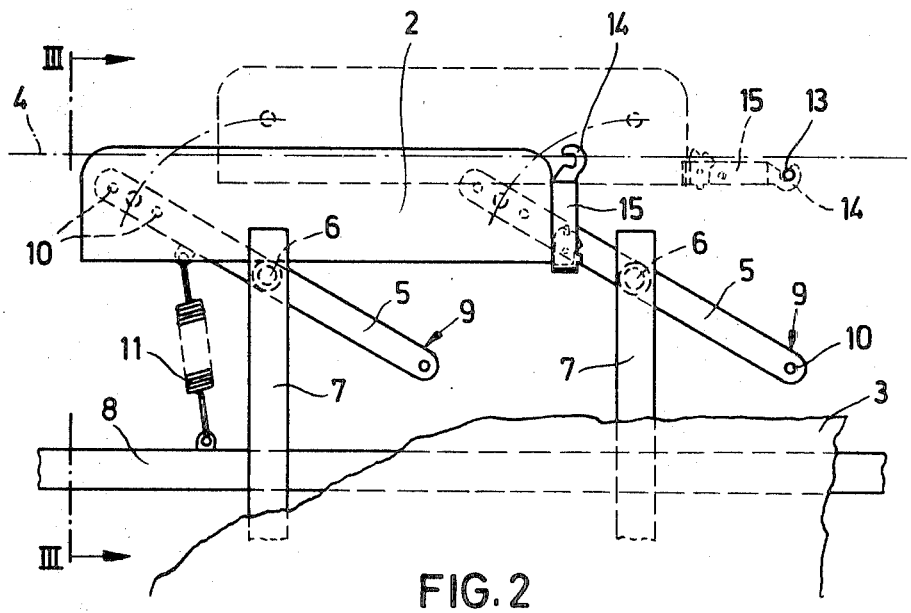
FIG. 2 is a plan view showing an automatically retractible running board.
Figure 3:
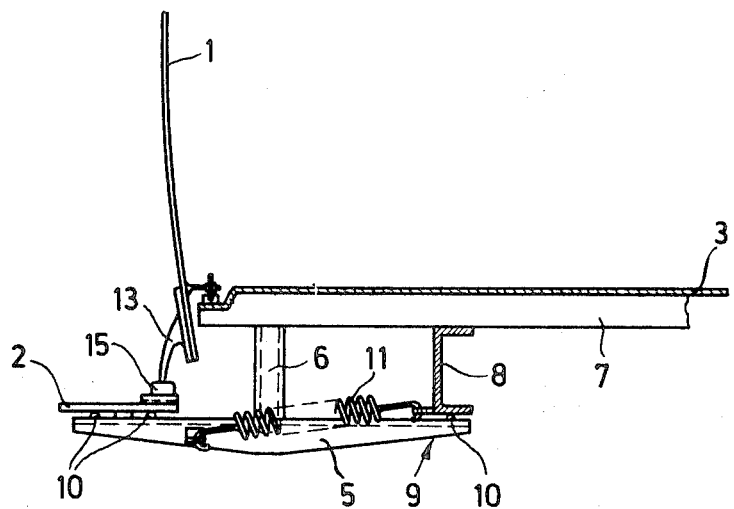
FIG. 3 is a cross section taken on the line III—III of FIG. 2 in the direction of the arrows showing it extended.

The motor vehicle shown in FIG. 1 is a minibus which has been equipped with a sliding door 1, and an automatically extendible running board 2, which has been sunk under a bottom plate 3, FIG. 3, but has been arranged in such a manner that it can be extended outwards horizontally by the movement of the door and that it lies with its outside longitudinal edge in the plane 4, FIG. 2, of the door when the sliding door 1 is closed.

The running board 2 has been articulated by means of two guide levers 5, guided in parallel to one another and with interposition of distancing elements 6 to the transverse bearers 7 of the frame 8 of the vehicle in such a manner that the free ends 9 of the guides 5, when the running board 2 is move out, are supported by the frame 8 of the motor vehicle. At the same time the guides 5 have been provided with sliders 10, made of plastic on the ends as well as on the side of the running board, and also on the side of the frame so that noises will be avoided whenever parts rub against each other during operation.

Figure 5:
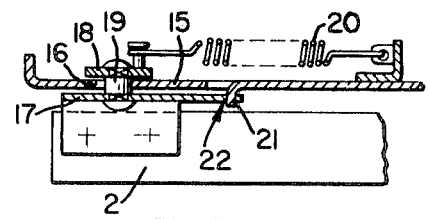
FIG. 5 is a sectional view taken along line V—V of FIG. 4.
Figure 4:
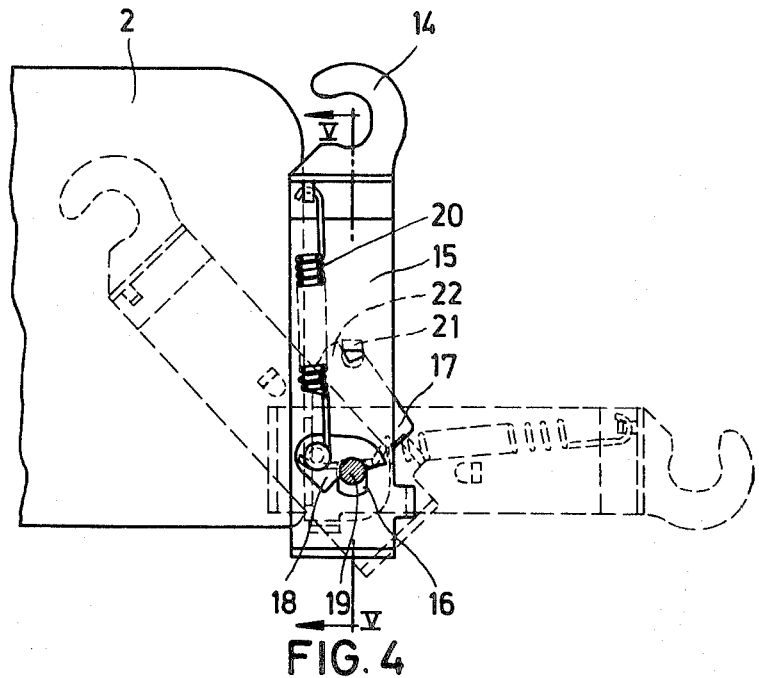
FIG. 4 is a top view showing a swivelable lever which cooperates with a sliding door and which operates the running board.

At the rear transverse edge of the running board 2 a lever 15, provided at its end with a hook 14, has been articulated swivelably. At the same time the lever 15 at its other end (see FIGS. 4 and 5) is provided with an oblong hole 16 pointed slantingly in the direction of the hook opening, which oblong hole is penetrated on the one hand by a flange 17 projecting above the plane of the running board 2, and on the other hand by a peg 19 connected with torsional strength with an arm 18. A draw or tension spring 20 suspended from the lever 15 engages at the end of arm 18, which spring does not merely brace the lever 15 against the peg 19, but also puts it under a torque force so that a cam 21 punched out of the lever 15, fits under tension against a doubly beveled stop of the flange 17 and thus holds lever 15 perpendicularly in relation to the wall of the door.

In the starting position shown in FIG. 2, a draw or tension spring 11 disposed between one guide 5 and the frame 8 of the vehicle, pulls the running board 2 toward the one distancing element 6. In this position a driver 13 attached in the stop side 12 of the sliding door 1, moves during opening of the sliding door 1 into the hook 14; thus the running board 2 and the sliding door 1 are coupled with one another. A further shifting of the sliding door 1 will cause a swinging out of the running board 2 from the plane 4 of the door counter to the force of the draw spring 11, whereby the lever 15 itself experiences a swiveling of 10°, FIG. 4, (shown in a broken line). The final position of the running board 2 having been moved out is determined by the final position and locking of the sliding door 1.

If someone by force, for example by stepping thereon, temporarily swings the running board 2 in such a manner that the driver 13 slides away across the hook 14, then the latter will be approached by the driver 13 during closure of the sliding door 1 from the direction of the backside. In that case lever 15 will not be bent since it will now overcome the stop 22 with the aid of the cam 21 and thus the driver 13 turns aside.

I claim:

1. An automatically retractable running board for motor vehicles having at least one sliding door, comprising, two horizontally disposed guide levers mounted beneath a bottom plate of said vehicle, said guide levers connecting said running board to said vehicle and being disposed parallel to one another, a first spring urging said running board inwardly toward said motor vehicle so that the outer longitudinal edge of said running board is made to lie substantially in the plane of said door when said door is closed, a lever having a hook at its outer end and being mounted perpendicularly to said door at the rear transverse edge of said running board for pivotal movement in a horizontal plane, and a driver post mounted at the forward end of said door engaging said transverse lever hook during the opening of said sliding door so as to cause said running board to be swung horizontally outwardly against the action of said first spring.

2. The automatically retractable running board according to claim 1 in which the length of said transverse lever is approximately equal to the distance which said running board is swung outwardly.

3. The automatically retractable running board according to claim 1 wherein said transverse lever is provided with an oblong opening at its inner end intending toward the hook at said outer end, a pivotal arm element on one side of said transverse lever and a flange member on the other side thereof, a peg intending through said oblong opening and interconnecting said arm element with said flange member, a second spring located on said transverse lever interconnected between said pivotal arm element and said transverse lever outer end, a cam element on said transverse lever projecting toward said flange member so as to be engaged thereby as said second spring urges the outer edge of said oblong aperture in contact with said peg for maintaining said transverse lever perpendicularly in relation to said door.

4. The automatically retractable running board according to claim 1 wherein each of said guide levers is mounted between their ends, and the free end of each said guide lever engages beneath and in contact with a portion of the motor vehicle frame when said running board has been swung fully outwardly.

5. The automatically retractable running board according to claim 1 wherein said first spring is secured at one end to one of said guide levers.

6. The automatically retractable running board according to claim 1 wherein said first spring is secured at its other end to said motor vehicle frame portion.